United States Patent Office 2,742,493
Patented Apr. 17, 1956

2,742,493
ARYLINDAN DICARBOXYLIC ACID ESTERS

Herman Pines, Chicago, Ill., assignor to Universal Oil Products Company, Chicago, Ill., a corporation of Delaware No Drawing. Application November 13, 1951,
Serial No. 256,151

2 Claims. (Cl. 260—475)

This invention relates to a certain class of organic compounds useful as foam depressants and to the process for their use, particularly as applied to aqueous systems which normally tend to foam when stirred or otherwise mixed with gases. More specifically, the present invention concerns certain arylindan dicarboxylic esters as compounds having the specific property of repressing foam formation in liquids which are agitated and which tend to foam when air or other gaseous media are mixed therewith.

The compounds of this invention act as foam depressants and foam retardants in liquid systems generally, including aqueous mixtures containing components which normally tend to cause foam when air or other gas is stirred or beat into the liquid. The problem of foam formation has become associated with a variety of processes, particularly in processes involving products or reactants which have a certain degree of surface activity. The problem arises in stirring, and aerating operations and particularly in distilling a mixture of components containing the foam-imparting ingredient, the vaporized liquid or gas introduced into the mixture causing the formation of more or less stable bubbles in the liquid undergoing aeration, distillation, etc. Thus, in the distillation of certain petroleum crudes containing phenolic and/or sulfur-containing compounds, foaming is observed when vapor begins to form. The resulting foam complicates the distillation due to entrainment of liquid foam in the effluent vapors leaving the distillation column and results in less decisive separation of the distillate fractions as well as resulting in the appearance of the undesirably colored bottoms material present in the charging stock in the distillate fractions. Likewise, in the removal of normally gaseous, liquefied components of sulfonation reaction mixtures by vaporization therefrom, as in the vaporization of butane diluent from a sulfonation reaction mixture, the volatilization of the diluent causes a profusion of bubbles or foam due to the surface activity of the sulfonic acids and/or sulfates in the reaction mixture. The presence of the foam in the vapor effluent not only represents an appreciable loss in yield of product but further results in contamination of the vapor condensate. Another instance in which foaming represents an undesirable condition is the production of steam from naturally occurring sources of water, such as untreated well water which contains appreciable quantities of carbonates and bicarbonates normally tending to decompose to yield carbon dioxide when heated, as for example, in the boiler of a steam-generating plant. Numerous other instances may be cited to indicate the magnitude of the problems associated with the separation and purification of a product which tends to foam or in the preparation of a product containing an impurity which foams. The present compounds, herein characterized as the alcohol esters of arylindan dicarboxylic acids, when incorporated into such systems normally having a tendency to foam when heated or stirred, preferably in an amount of from about 0.001 to about 10% by weight of the mixture subject to foaming, effectively repress or retard the formation of foam and permit stirring, distillation, etc. of such mixtures without troublesome foam formation.

The foam depressants provided by the present invention are compounds which have the structure of arylindan dicarboxylic acid esters, represented by the structural formula:

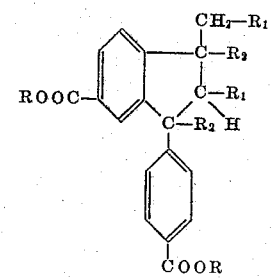

wherein R is the hydrocarbon, oxy-hydrocarbon or hydroxy-substituted hydrocarbon residue of a molecule of an alcohol, glycol, or phenol joined to the nuclear carboxyl group and where $R_1$ and $R_2$ are selected from the group consisting of alkyl, cycloalkyl, cycloalkalkyl, and hydrogen. Preferably $R_1$ and $R_2$ are alkyl radicals, and R is a polyoxyhydroxy polyalkylene residue of a polyoxy polyalkylene glycol the ester group being formed by the condensation of the polyalkylene glycol with the arylindan dicarboxylic acid reactant in the present process.

In general, the present foam depressant agents are prepared by esterification of a selected alcohol with an arylindan dicarboxylic acid prepared in a preliminary stage of the process by means of a particular procedure as hereinafter described.

The intermediate alkylaryl indan dicarboxylic acids utilized in the present esterification reaction are prepared prior to the esterification by the oxidaton of the alkyl groups substituted on the aryl nuclei of an arylindan hydrocarbon, said alkyl groups occupying positions corresponding to the position of the carboxyl groups in the oxidation product. The alkylaryl indan reactants in the oxidation reaction are synthesized initially by the condensation of a p-dialkyl substituted benzene hydrocarbon in which one of the pairs of alkyl substituents is a hydrocarbon radical joined to the benzene nucleus through a secondary carbon atoms, said condensation being effected under hydrogen transfer reaction conditions in the presence of a branched chain olefin or cycloolefinic hydrocarbon capable of accepting hydrogen atoms from the p-dialkyl substituted benzene hydrocarbon undergoing condensation. Thus, p-sec-butyltoluene and other p-sec-alkyltoluenes comprise suitable utilizable starting materials in the condensation reaction resulting in the formation of the alkylaryl indan compound involved in the oxidation step to form the intermediate arylindan dicarboxylic acid. Although the hydrocarbon substituent groups attached to the secondary carbon atom substituted on the benzene ring in a para position relative to the other alkyl substituent thereof are preferably alkyl groups, they may also be cycloalkyl or cycloalkalkyl radicals. The alkyl group substituted on the benzene ring in a para position relative to the secondary alkyl group are preferably methyl radicals, although longer chain alkyl groups, such as ethyl, propyl, butyl etc., as well as cycloalkyl groups may likewise be substituted on the benzene ring in a position para to the secondary alkyl group.

The branched chain or cycloolefinic compound which acts as a hydrogen acceptor in the condensation reaction of the paradialkyl substituted benzene hydrocarbon, includes such hydrocarbons as trimethylethylene, dihydrolimonene, methylcyclohexane, 1,1,3-trimethylcyclohexene, menthene, etc. The particular olefinic hydrocarbon specie utilized in the condensation reaction as the hydrogen acceptor therein also depends upon the catalyst and the particular para-dialkyl-substituted benzene hydrocarbon involved in the condensation reaction as primary reactant.

The preparation of the alkylaryl indan initial reactant via the condensation of the para-dialkyl benzene hydrocarbon under hydrogen transfer reaction conditions is effected in the presence of a catalyst characterized as an acid-acting inorganic compound. Included in the latter category of condensation catalysts are such compounds as the mineral acids, such as sulfuric acid, chlorosulfonic acid, hydrogen fluoride, a phosphoric acid and the Friedel-Crafts halide catalysts, particularly aluminum chloride, aluminum bromide, ferric chloride, boron trifluoride, etc. In some instances it is preferable to utilize a catalyst which is of intermediate activity in causing acid-catalyzed condensation reactions, such as the Friedel-Crafts complexes of the above halide catalysts, including the etherates, alcoholates, and the acetonates, typically represented by such complexes as aluminum chloride mono-ethanolate, a boron trifluoride etherate, an aluminum chloride acetonate etc., the preparation and use of which are well known in the art. The preferred catalysts for effecting the condensation of the indicated para-dialkyl-substituted benzene hydrocarbons are the Friedel-Crafts halide complexes, such as boron trifluoride mono-etherate.

The condensation of the para-dialkyl-substituted benzene hydrocarbon reactant in the presence of the branched chain or cycloolefin at hydrogen transfer reaction conditions may be effected at temperatures of from about $-30°$ to about 200° C., (depending upon the catalyst utilized and its activity in causing side reactions during the condensation) and at superatmospheric pressures, up to about 100 atmospheres. The condensation occurs when the mixture of para-dialkyl-substituted benzene hydrocarbon and the alkyl acceptor hydrocarbon is mixed with the acid-acting catalyst at the above hydrogen transfer reaction conditions, the hydrocarbon products separating from the catalyst sludge formed in the reaction. The hydrocarbon condensation product is separated by decantation from the catalyst sludge, washed with water to remove excess catalyst, dried and subjected to distillation to separate the alkylaryl indan product from unreacted hydrocarbon starting materials.

The synthesis of the intermediate arylindan dicarboxylic acid reactant from the alkylaryl indan hydrocarbon formed by the condensation reaction hereinabove described is effected by oxidation of the nuclear alkyl groups to carboxyl groups in corresponding nuclear positions on the aromatic hydrocarbon ring. The selective oxidation of the nuclear aromatic alkyl groups may be accomplished by well known means, particularly preferred being the oxidation effected in aqueous media with such oxidizing agents as chromic acid, alkali, metal permanganates, or aqueous nitric acid solutions, at temperatures of from about 20° to about 200° C., depending upon the oxidizing agent utilized. Thus, a 1,2,3,3,6-pentaalkyl-1-p-alkylphenylindan is oxidized to a 1,2,3,3-tetraalkyl-1 (4-carboxyphenyl)-6-carboxyindan. Similarly, 1,2,3,6-tetramethyl-3-ethyl-1-p-tolylindan which is formed, for example, by the condensation of p-sec-butyltoluene under hydrogen transfer conditions, is oxidized by selective oxidation of the p-tolyl groups to form 1,2,3-trimethyl-3-ethyl-1-(4-carboxyphenyl)-6-carboxyindan.

The formation of the present foam depressant composition consisting of the aforementioned arylindan dicarboxylic acid esters is effected by esterification of the previously prepared arylindan dicarboxylic acid with an organic compound containing at least one hydroxyl group per molecule, preferably a multiple hydroxy-substituted organic compound, such as the alcohols, phenols and polyhydroxy alcohols and phenols. Simple monohydroxy-substituted organic compounds, such as the simple aliphatic and naphthenic alcohols, as well as the monohydroxy phenols are esterified with the arylindan dicarboxylic acid by heating the latter acid and the alcohol in the presence of an acid catalyst until the carboxyl groups are completely esterified. Esterification is usually effected in aqueous solution or in a suspension of the reactants, the aqueous phase containing from about 0.5 to about 10% by weight of a mineral acid catalyst, such as sulfuric acid, hydrochloric acid, phosphoric acid, etc. at approximately the boiling point of the aqueous solution. The resulting ester of the monohydroxy-substituted organic compound is generally relatively insoluble in water and is usually used as a foam retardant or depressant in non-aqueous systems, such as hydrocarbon mixtures, etc. The esterification of the arylindan dicarboxylic acid may also be effected with polyhydroxy alcohols or with alcohols containing other water-solubilizing radicals, such as sulfo and sulfonate groups, and amino radicals, which tend to solubilize the dicarboxylic acid ester in aqueous systems, thereby rendering the ester particularly useful in retarding the formation of foam in such aqueous systems. The preferred hydroxyl-substituted organic compounds utilizable for the production of water-soluble dicarboxylic acid esters are the polyoxy-polyalkylene glycols having the general formula:

$$HO(C_nH_{2n}O)_xOH$$

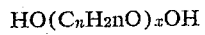

wherein $n$ has a value of from 2 to 5 and $x$ is a whole number having a value of from 2 to about 20. The latter preferred polyoxy-polyalkylene glycols include the ethylene glycol polymers, the propylene glycol polymers, the butylene glycol polymers and the amylene glycol polymers containing an average of from about 2 to about 20 oxyalkylene groups per molecule. In the preparation of the dicarboxylic acid diester from the polyoxyalkylene glycols, the preferred procedure comprises converting the arylindan dicarboxylic acid to the corresponding acyl chloride in order to increase the yield of ester and/or to promote the speed of reaction resulting in the formation of the diester. For this purpose, the arylindan dicarboxylic acid may be converted to the corresponding dicarbonyl chloride by reacting the acid with phosphorous pentachloride and isolating the resulting dicarbonyl chloride from the reaction mixture. The dicarbonyl chloride is thereafter condensed with alcohol, phenol, or a polyhydroxy organic compound such as polyoxy-polyalkylene glycol by heating a mixture of the reactants to room temperature or above until the evolution of hydrogen chloride from the reaction mixture ceases.

The esterification of the arylindan dicarboxylic acid with a polyoxy-polyalkylene glycol may also be effected by condensing the arylindan dicarboxylic acid with the corresponding alkylene oxide until the oxyalkylene polymer contains the desired number of oxyalkylene groups. The condensation of the alkylene oxide with the arylindan dicarboxylic acid is effected thermally by heating a mixture of the reactants at a temperature of from about 50° to about 150° C., generally at a superatmospheric pressure sufficient to maintain substantially liquid phase conditions in the reactor and until the chain length of the polyoxyalkylene group is sufficient to impart the desired degree of water solubility to the ultimate condensation product. The reaction period and ratio of alkylene oxide to arylindan dicarboxylic acid are critical process variables which determine the ultimate chain length of the polyoxyalkylene radical comprising the ester linkage of the product. The reaction, time, ratio of the alkylene oxide to arylindan dicarboxylic acid reactant, the temperature, pressure and the choice of the particular alkylene oxide reactant utilized in the reaction depend upon the desired water solubility of the ultimate ester product as well as other physical properties desired of the product.

Foam retardation utilizing the present arylindan dicarboxylic acid ester is accomplished by adding to the mixture which has the tendency to foam an amount of the ester corresponding to from about 0.001 to about 10% by weight of the mixture, although amounts of from about 0.1 to about 2% by weight of the mixture are preferred to accomplish the desired degree of foam retardation. If desired, the arlylindan dicarboxylic acid ester may generally be removed from the mixture to which the foam depressant has been added by extraction with a suitable solvent therefor which is insoluble in the material extracted, such extractive solvents including diethyl ether, the liquid hydrocarbons such as pentane, benzene, toluene, etc.

The present invention is further illustrated with respect to specific embodiments thereof, in the following example, which, however, is not intended to unduly limit the generally broad scope of the invention in strict accordance therewith.

p-Sec-butyltoluene, may be condensed to form an alkyl-arylindan in the presence of 4-methylcyclohexene and hydrogen fluoride at a temperature of 0° C., the reaction forming a mixture of compounds from which a fraction having a boiling point range of 163–169° C. at 4 mm. Hg pressure and a refractive index at 20° C. of 1.5565 corresponding in analysis to the compound: 1,2,3,6-tetramethyl-3-ethyl-1-p-tolylindan.

Oxidation of the above tolylindan to the corresponding dicarboxylic acid may be effected by reacting the compound with a solution of seven grams of chromic acid in 30 ml. of acetic acid, 30 ml. of water and 5 ml. of sulfuric acid at substantially room temperature. The resulting dicarboxylic acid has a melting point of 309–312° C., a neutral equivalent of 175 and corresponds in analysis to 1,2,3-trimethyl-3-ethyl-1-(4-carboxyphenyl)-6-carboxyindan.

The arylindan dicarboxylic acid ester of a polyoxy-ethylene glycol ester containing an average of about fifteen oxy-ethylene units per group is prepared by reacting the previously synthesized dicarboxylic acid with ethylene oxide until the carboxylic acid ester groups on the arylindan molecule contain the above number of oxy-ethylene units per ester radical. For this purpose, the dicarboxylic acid arylindan is dissolved in benzene to the extent of ten grams of acid per 100 cc. of benzene and the mixture rapidly stirred as ethylene oxide is pressured into the reactor at a temperature of 50° C. to a pressure of fifteen atmospheres. Samples of the ester are removed from the reaction mixture as the esterification proceeds until the desired chain length of the oxy-ethylene radical has been obtained, usually within a reaction period of approximately 15–20 minutes; the mixture is then cooled to stop the reaction. The residue remaining after evaporation of the benzene solvent is the desired ester.

A sulfonation reaction mixture containing dissolved butane, which normally foams profusely when an attempt is made to vaporize the butanes from the system does not produce an appreciable quantity of foam when the present arylindan dicarboxylic acid ester of the polyoxy ethylene glycol prepared as indicated above is incorporated into the sulfonation reaction mixture in amounts of the compound as low as 0.1% by weight of the reaction mixture. An even smaller quantity of the arylindan dicarboxylic acid ester depresses foaming completely in a 0.03 molar sodium laurate solution in distilled water which normally produces copious foam when the solution is shaken.

I claim as my invention:

1. A compound having the formula:

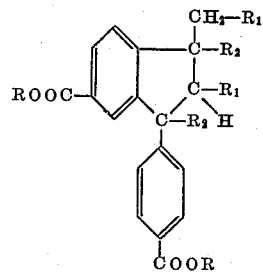

wherein R is a polyalkylene glycol ester group and $R_1$ and $R_2$ are lower alkyl radicals.

2. The compound of claim 1 further characterized in that said R group contains from 2 to about 20 ethylene groups per R group.

References Cited in the file of this patent

UNITED STATES PATENTS 2,575,298    Ryznar ---------------- Nov. 13, 1951